Dec. 9, 1958    R. E. J. NORDQUIST    2,863,553
CAN LOADING APPARATUS
Filed Dec. 29, 1954    7 Sheets-Sheet 5
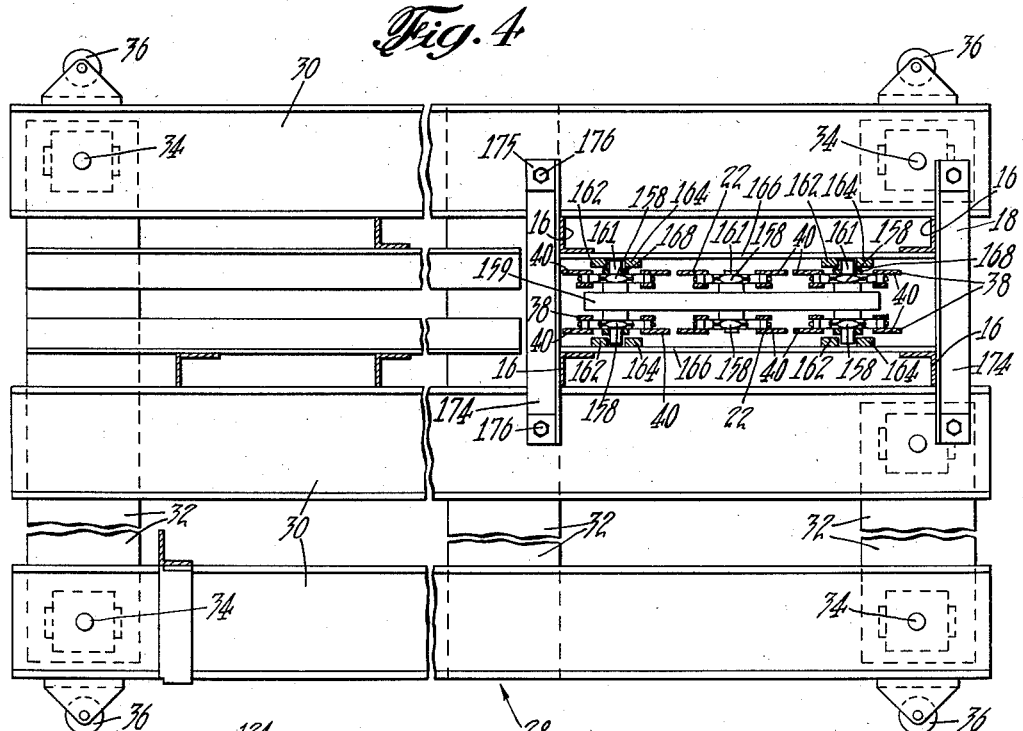
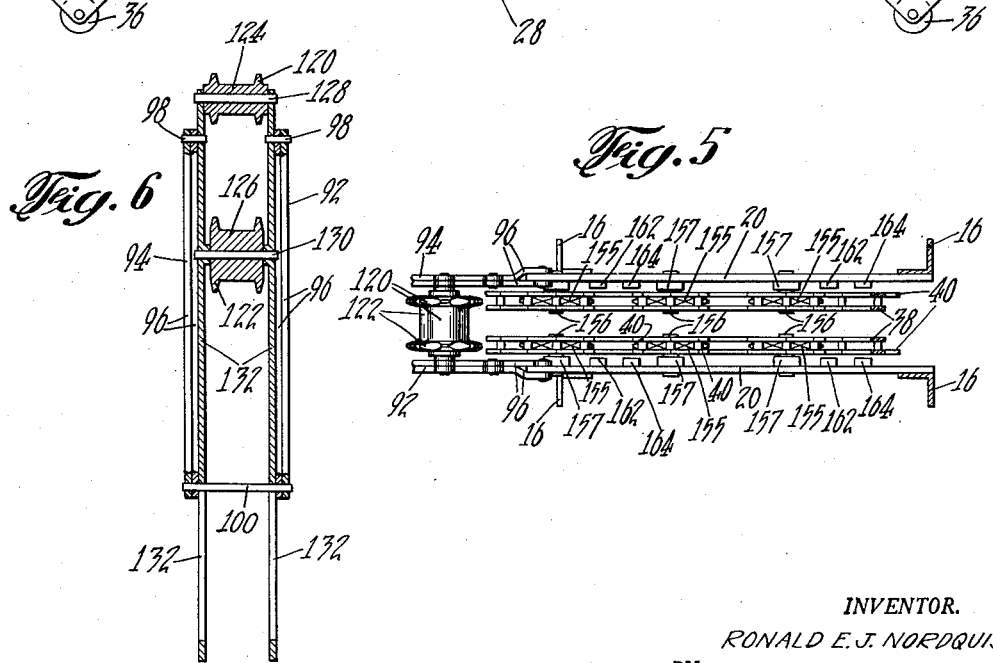
INVENTOR.
RONALD E. J. NORDQUIST
BY
ATTORNEYS INVENTOR.
RONALD E. J. NORDQUIST
BY Charles H. Erne
Leland R. McCann
George W. Rliber
ATTORNEYS

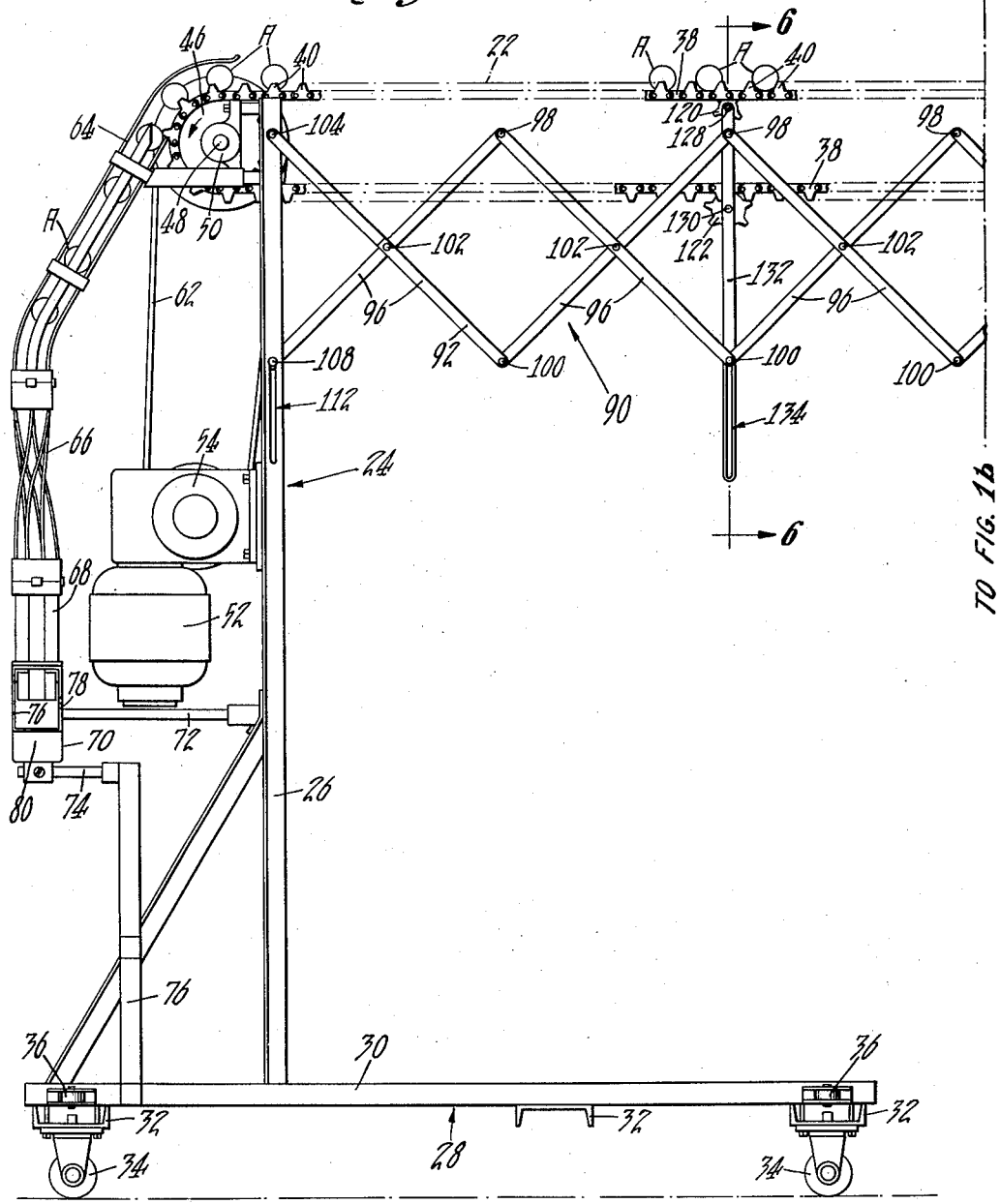

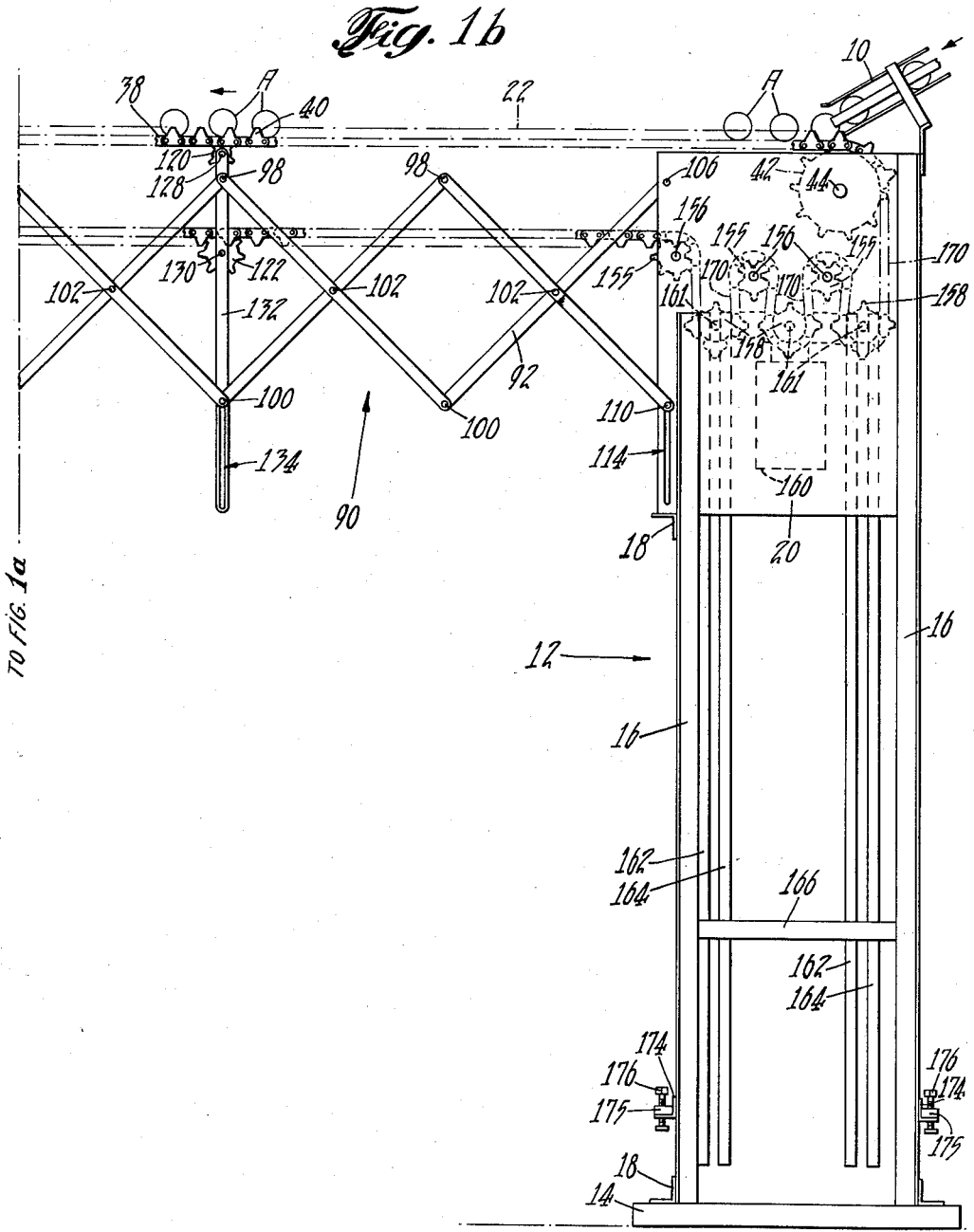

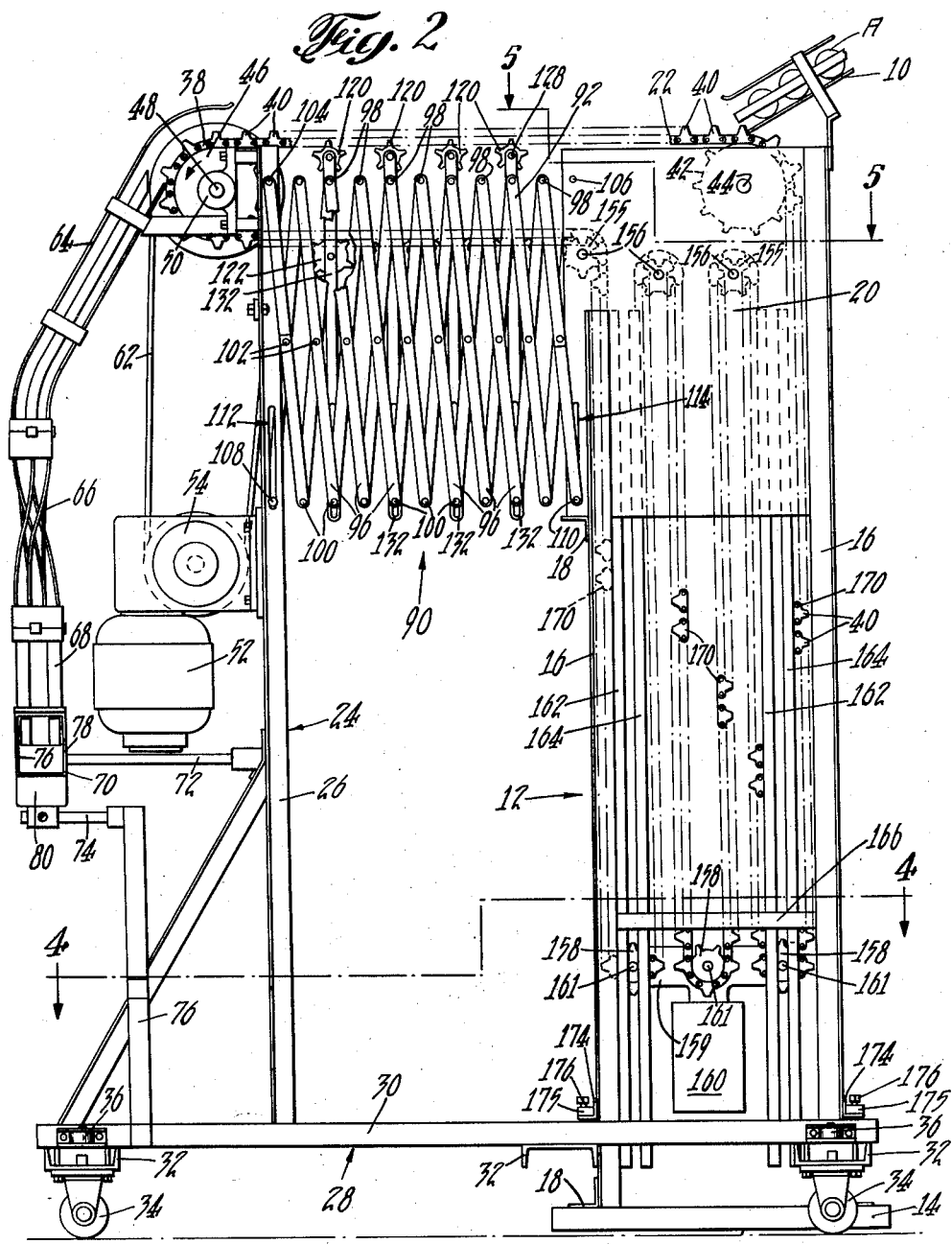

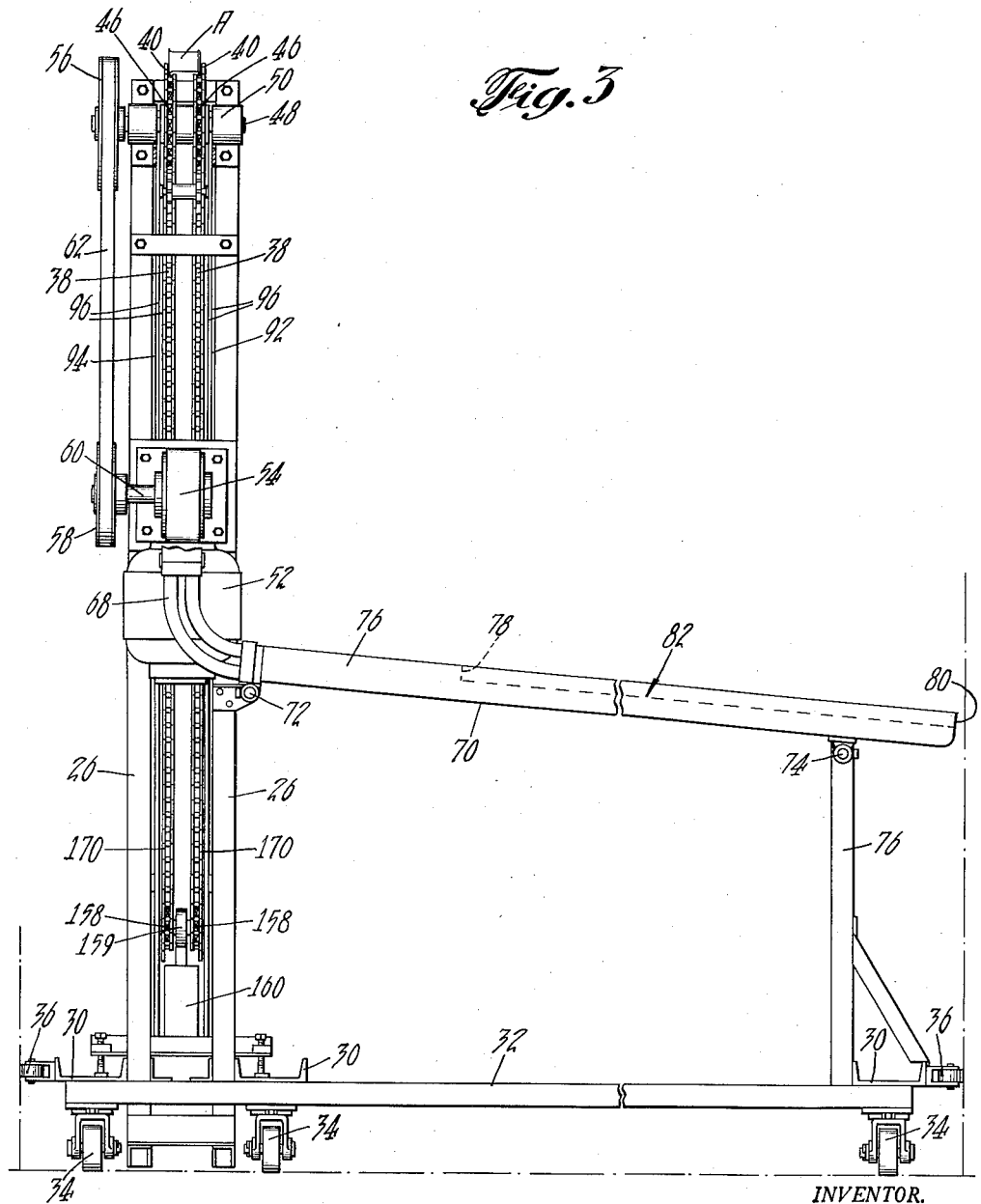

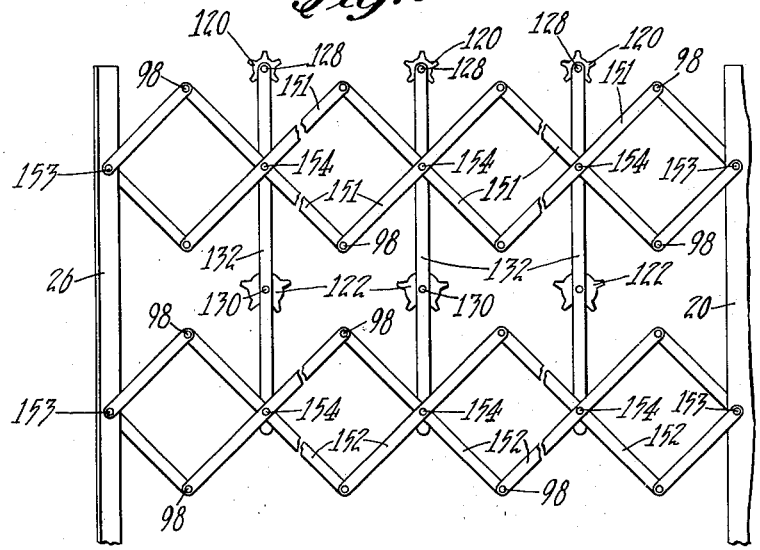
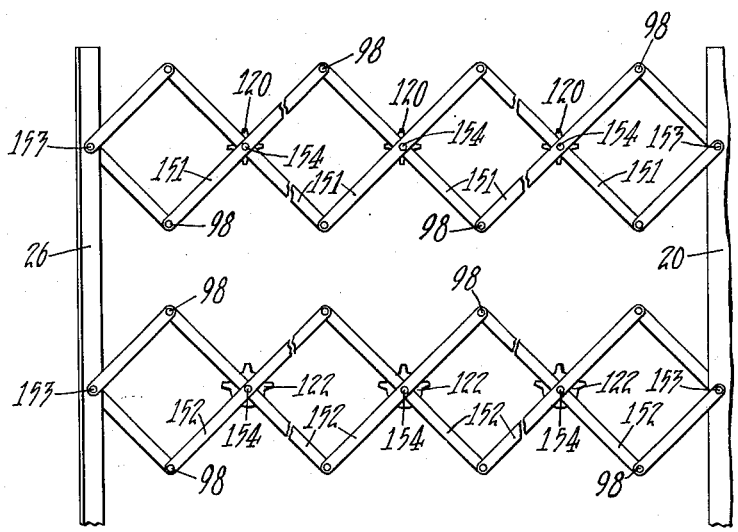

United States Patent Office 2,863,553
Patented Dec. 9, 1958

2,863,553

CAN LOADING APPARATUS

Ronald E. J. Nordquist, Summit, N. J., assignor to American Can Company, New York, N. Y., a corporation of New Jersey Application December 29, 1954, Serial No. 478,373

5 Claims. (Cl. 198—139)

The present invention relates to an apparatus for delivering cans into loading position in a storage enclosure, and has particular reference to a movable loading support or rack which is supplied with cans by means of a positively driven endless conveyor which automatically adjusts its length to the position of the support within the compartment as the support is moved backwards by the operator as the enclosure becomes filled with cans.

In the warehousing or shipment of articles such as empty cans, it is a common practice to stack cans in a storage enclosure, such as a freight car or storage bin, in superposed horizontal rows, the stacking beginning at the farthest end of the enclosure and progressing towards the enclosure entrance through which the cans are received. As a rule, some type of can supplying equipment is utilized to deliver the cans to the stacking area where they are stacked manually by a competent workman using a stacking fork.

The present invention contemplates a means for facilitating this stacking operation by providing an improved apparatus for supplying the cans to the stacking area. This is accomplished by providing a movable can loading support or rack having a can holding tray which is disposed at the stacking area for presenting the cans in an advantageous position to the stacker, the support being supplied with cans through the medium of a positively driven endless delivery conveyor which is mounted intermediate its ends on a frame which collapses automatically as the support is gradually moved backwards by the stacker as the can stack is extended from the far end to the entrance of the enclosure.

An object of the invention therefore, is the provision of a can loading apparatus which embodies an automatically adjustable, positively driven, delivery conveyor which permits the apparatus to be gradually withdrawn from a storage compartment or enclosure without requiring manual adjustments for changing the length of the conveyor, thus relieving the stacker of extraneous operations and permitting him to concentrate his attention on the actual stacking of cans.

Another object is the provision of such an apparatus in which the adjustable conveyor is mounted on a collapsible pantograph frame which provides a rigid intermediate support for the conveyor throughout its whole delivery range.

Another object is the provision of a collapsible pantograph frame for the adjustable conveyor, the frame being so mounted as to maintain the upper, can supporting flight of the conveyor at a constant height throughout its whole delivery range.

Still another object is the provision in such an apparatus of floatingly mounted tensioning means for taking up the slack in the conveyor which is created as the effective delivery length of the conveyor is decreased.

Yet another object is to provide an automatically adjustable can delivery apparatus which is collapsible to form a unitary, self-contained, portable assembly which can be easily moved into operating position within the storage enclosure.

Numerous other objects and advantages of the invention will be apparent as it is better understood from the following description, which, taken in connection with the accomyanying drawings, discloses a preferred embodiment thereof.

Referring to the drawings:

Figures 1A and 1B, when taken together, provide a side elevation of the can delivery apparatus of the present invention in fully extended position, parts being broken away;

Fig. 2 is a side elevation of the same apparatus in fully collapsed position;

Fig. 3 is a front elevation of the apparatus when viewed from the left in Fig. 2;

Figure 7:
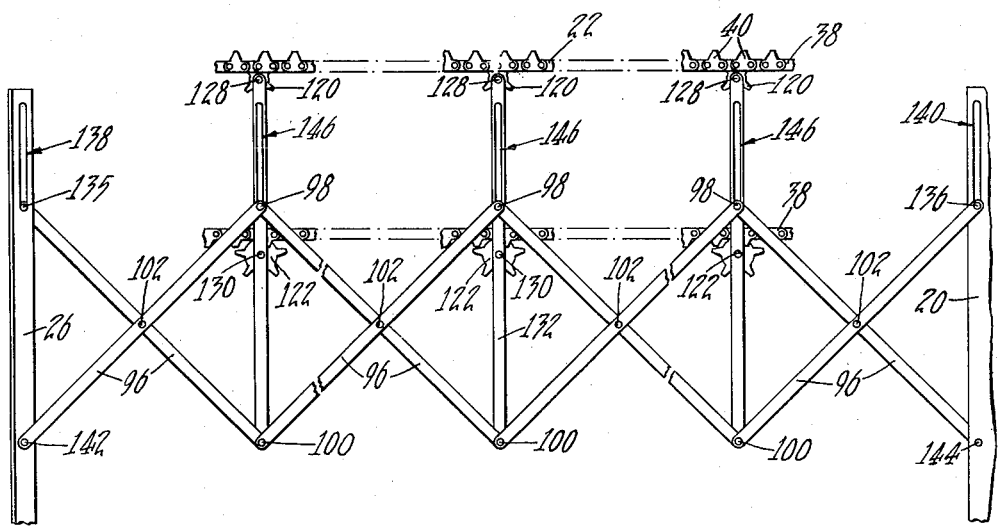

Figs. 4 and 5 are horizontal sections taken substantially along the lines 4—4 and 5—5, respectively, in Fig. 2, parts being broken away;

Fig. 6 is a vertical section taken substantially along the line 6—6 in Fig. 1A; and Figs. 7, 8, 9 and 10 are fragmentary side elevations showing modified forms of the collapsible pantograph frame, parts being broken away.

As a preferred or exemplary embodiment of the instant invention, the drawings disclose an apparatus designed to facilitate the bulk loading of empty cans A into storage enclosures such as freight cars are warehouse bins.

The cans A are received from a suitable source of supply, such as a manufacturing line, through a conventional inlet or delivery gravity runway 10 (see Fig. 1B) which may be removably secured to a stationary or fixed frame or support 12 which is disposed at the entrance of the storage enclosure. It should be understood that the support 12 is not necessarily secured to the floor of the storage enclosure and need be stationary only during the operation of the apparatus, since it is normally not a permanent installation. The support 12 includes a suitable base 14, four angle iron corner uprights 16, suitable cross-braces 18 and a pair of side plates 20.

The cans A, which roll along the inlet runway 10 on their sides under the influence of gravity, are delivered onto an endless positively driven conveyor 22 which carries the cans from the fixed support 12 to a movable frame or support 24 (see Fig. 1A), which at the start of the can loading operation is positioned at the far end of the storage enclosure and is thus spaced a considerable distance from the fixed support 12.

The movable support 24 includes a pair of spaced uprights 26 which are secured to a suitable rectangular base 28 which comprises three longitudinal channel members 30 tied together by means of three transverse channel members 32, which preferably are slightly less in width than the storage enclosure into which the cans A are to be stored. A set of casters 34 is secured to the bottom of the base 28 to permit it to be rolled in any desired direction. A set of horizontal casters 36 is preferably secured to the sides of the base 28 to guide it along the side walls of the storage enclosure (indicated by the vertical dot and dash lines in Fig. 3) and prevent it from binding thereagainst. The transverse channel members 32 may, if desired, be made adjustable to adapt the apparatus for use in enclosures of varying widths.

The endless conveyor 22 preferably is composed of a pair of endless chains 38 (see Figs. 1A, 1B and 3) laterally spaced apart a sufficient distance to support the ends of the cans A. The chains 38 are provided with side plates 40 spaced apart transversely of the conveyor a distance slightly greater than the length of a can (see Figs.

1A, 3 and 5) which prevent lateral movement of the cans A and thus keep them from falling off. The side plates 40 may either be extra plates which are secured to the regular links of the chains 38, or may be formed as integral extensions of the chain links.

The spaced chains 38 operate at one end of the apparatus around a pair of correspondingly spaced idler sprockets 42 which are mounted on a shaft 44 (see Figs. 1B and 2) secured in the side plates 20 of the fixed support 12. At the other end, the chains 38 operate around a pair of spaced drive sprockets 46 which are keyed to a shaft 48 (see Figs. 1A and 3) which is journalled in bearings 50 secured to the uprights 26 of the movable support 24. The drive sprockets 46 are driven by a motor 52 through the agency of a suitable reduction unit 54 (see Fig. 3), a pair of pulleys 56, 58 which are keyed to the sprocket shaft 48 and a shaft 60 of the reduction unit 54, respectively, and a driven belt 62. All of this driving mechanism is carried by the movable support 24.

The forward movement of the conveyor chains 38 carries the cans A to the far end of the loading apparatus, as seen at the left in Fig. 1A, which is disposed adjacent the loading area, and delivers them into an inclined conventional discharge gravity runway 64, which may deliver them to any suitable place of deposit. In the apparatus disclosed in the drawings, the cans pass from the runway 64 into a can twister 66 which turns them through an angle of 90° and delivers them to an elbow runway section 68 (see Fig. 3) which discharges them into an inclined open-top loading tray 70. Tray 70 extends across the front of the movable support 24, being supported at its higher end by a rod 72 secured to one of the uprights 26 and at its lower end by a rod 74 secured to a short angle-iron upright 76 carried by the base 28.

The loading tray 70 is provided with two shallow side walls 76, 78 and an end wall 80 which acts as a can stop. The inner wall 78 of the tray 70 is preferably cut away at 82 (see Fig. 3) to expose the open ends of the cans A in the tray and permit the operator to insert a stacking fork into a row of cans and lift them from the tray 70. By referring to Figs. 1A, 3 and 4, it can be seen that the area behind the loading tray 70 is comparatively open and unobstructed, since the upright portion of the movable support 24 is positioned at one of its front corners (See Figs. 3 and 4). This permits the operator to stand within the base 28 facing the tray 70 and lift the cans A from the tray and stack them in front of the movable support 24.

As seen in Figs. 1A and 1B, the movable support 24 is spaced a considerable distance from the fixed support 12 when the loading of an empty storage enclosure is begun, since the movable support 24 must be positioned at the far end of the enclosure. Consequently the delivery span of the endless chains 38 is too long to permit it to operate satisfactorily without additional support intermediate its end sprockets 42 and 46. In order to provide this necessary support, an extensible and collapsible frame 90 is provided between the fixed support 12 and the movable support 24.

The collapsible frame 90 comprises two laterally spaced pantographs 92, 94 (see Figs. 1A, 1B, 2 and 3) each of which is composed of a plurality of elongated links 96 of equal length. The adjacent links 96 of each pantograph are pivotally secured together at their upper ends by means of short pivot pins 98 and at their lower ends by long pins 100 which span the lateral distance between the pantographs and act as spacers. The links 96 are also pivotally secured at their centers by short pins 102.

To permit extension or collapse of the pantographs 92 94 the end links at the top of the pantographs are mounted on pivot pins 104, 106 which are respectively secured at fixed coplanar points in the movable support uprights 26 and the fixed support side plates 20 (see Figs. 1A, 1B and 2), while the end links at the bottom of the pantographs are mounted on pivot pins 108, 110 which are slidable in slots 112, 114 formed in the uprights 26 and side plates 20, respectively. As a result of this mounting the level of the top of the pantograph frame 90 remains constant regardless of whether the frame is collapsed or extended.

The upper and lower horizontal flights of the conveyor chains 38 are supported on vertically spaced sets of idler sprockets 120, 122 (see Figs. 1A, 1B, 2 and 6) which are longitudinally spaced along the pantograph frame 90. The idler sprockets 120, 122 preferably are formed with single hubs 124, 126 respectively (see Fig. 6), which carry double sets of sprocket teeth which engage and support the two chains 22. The hubs 124, 126 are mounted on short transverse shafts 128, 130, the ends of which are mounted in laterally opposed sets of vertical mounting bars 132 (see Fig. 6).

In order to prevent vertical shifting of the sprockets 120, 122 it is necessary that they be secured to the pantographs 92, 94 at fixed points which are coplanar with the fixed points at which the pantographs are secured to the supports 12 and 24. This is accomplished by fixedly mounting each bar 132 on a pivot pin 98 (see Figs. 1A, 1B and 2), since these pivot pins are coplanar with the fixed pivot pins 104, 106.

The bars 132 extend below the bottom of the pantographs 92, 94 and are maintained in vertical position by means of the pins 100 which slide within slots 134 formed in the bars 132 and are disposed in vertical alignment with the pins 98. Since the bars 132 are secured to the top of the pantograph frame 90, which portion of the frame remains at a constant level, there is no vertical movement of the bars 132 and consequently there is no vertical movement of the endless conveyor 22 during collapse or extension of the frame. Because of this, and since the conveyor is adequately supported by the sprockets 120, 122 even when the frame 90 is in fully extended position, the conveyor 22 can remain in motion at all times during the stacking operation, even when the frame is actually being extended or collapsed.

It is obvious that the same result can be obtained by mounting the pantographs 92, 94 so that the bottom of the frame 90 remains at constant level, and securing the bars 132 to the bottom of the frame. As seen in Fig. 7, this can be accomplished by mounting the upper ends of the pantographs on slidable pins 135, 136 which operate in slots 138, 140 formed in the uprights 26 and side plates 20, respectively, and mounting their lower ends on fixed pivot pins 142, 144 in the uprights 26 and side plates 20. In this modified form the vertical bars 132 are fixedly mounted on the pins 100 at the bottom of the frame, the upper pins 98 operating within slots 146 formed in the upper portions of the bars 132 to maintain the bars in vertical position.

Figure 8:
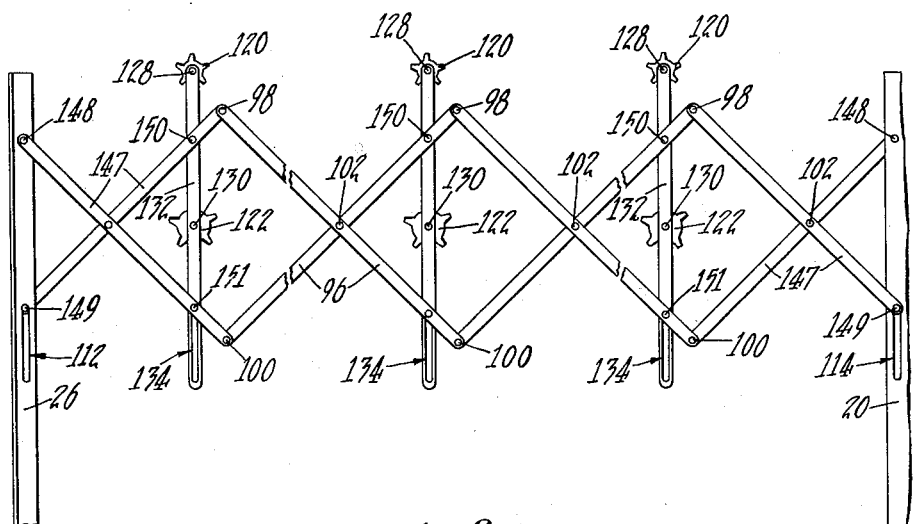

Figs. 8 through 10 illustrate some of the many other modified pantograph constructions which can be utilized to support the intermediate sprockets 120, 122.

The construction of Fig. 8 is similar to that disclosed in Figs. 1 through 6, except that the end links 147 are shorter than the other links of the pantograph and are secured to the supports 12 and 24 on fixed pivot pins 148 and slidable pins 149. Since the pivot pins 98 in this construction are not in the same plane as the fixed pin 148, they cannot be used to secure the vertical bars 132. Instead, the bars 132 are secured to fixed pins 150 which are coplanar with the pins 148. Pins 151, located in vertical alignment with the pins 150 are provided to hold the bars 132 in upright position.

Figs. 9 and 10 disclose modified forms of the invention in which each side of the collapsible frame comprises a pair of vertically spaced pantographs 151, 152, each end of each pantograph being mounted on only a single fixed pin 153. In the construction of Fig. 9, the vertical bars 132 are still utilized, being secured to both pantographs on fixed pins 154 which connect the pantograph links at their centers. In the construction disclosed in Fig. 10, the bar 132 is dispensed with and the sprockets 120, 122 are mounted directly on the pins 154.

It should be noted that all of the disclosed forms of the invention have one feature in common, namely, that the intermediate supporting sprockets are secured to the pantographs, either directly or indirectly through the vertical bars 132, at fixed points which are coplanar with the fixed points at which the ends of the pantographs are secured to the supports 12 and 24. It is this feature which prevents vertical movement of the sprockets when the pantographs are extended or collapsed.

It can be seen by comparing Figs. 1A, 1B with Fig. 2 that the effective horizontal delivery span of the conveyor 22 varies greatly, being dependent upon the distance between the movable support 24 and the fixed support 12. It is therefore necessary to provide means for maintaining the conveyor under suitable tension in order to take up the slack which results when the horizontal length of the conveyor is shortened. This is done by threading the conveyor chains between laterally spaced sets of fixed sprockets 155 (see Figs. 1B, 2 and 5) which are mounted on short shafts 156 journalled in bearings 157 secured to the side plates 20 of the fixed support 12, and laterally spaced sets of movable sprockets 158 (see Figs. 1B, 2 and 4) which are mounted on a slide 159 which is provided with a weight 160 and is mounted for vertical reciprocation within the support 12 below the sprockets 155. The movable sprockets 158 are mounted on transverse shafts 161 which are secured in the slide 159.

To provide for vertical guidance of the slide 159 the end shafts 161 project beyond the sprockets 158 into vertical tracks formed by pairs of track-bars 162, 164 (see Figs. 1B, 2, 4 and 5) which are secured at their upper ends to the side plates 20 and at their lower ends to bars 166 fastened to the uprights 16. The slide 159 is centralized between the track bars 162, 164 by means of spacing collars 168 carried by the projecting shafts 161.

In the apparatus disclosed in the drawings, three fixed sprockets 155 and three movable sprockets 158 are provided for each chain 38. Consequently, three vertical take-up or slack loops 170 are formed in each conveyor chain 38, the loops 170 being maintained under constant tension by the weighted sprocket slide 159 and taking up the excess chain which is created when the apparatus is partially or completely collapsed.

It is highly desirable that the apparatus of the instant invention be made portable in order that it may be easily transferred from one storage compartment to another. To provide for this, the rear cross piece 32 (to the right as seen in Figs. 2 and 4) is cut away to provide a recess into which the fixed support 12 may telescope when the apparatus is completely collapsed. The support 12 is provided with a pair of angle-iron cross-members 174, the ends of which project over two of the longitudinal channel members 30 (see Fig. 4) of the movable support base 28 and are provided with threaded bearings 175 to receive bolts 176, which, when turned or tightened engage against the channel members 30, and raise the base 14 of the fixed support 12 from the floor. The whole apparatus is thus supported by the casters 34 and may be transported as a single unitary structure.

In use, the apparatus is rolled into position adjacent an entrance of the storage enclosure or compartment and the bolts 176 are loosened to lower the base 14 of the fixed support 12 onto the floor. The movable support 24 is then rolled away from the fixed support 12 until it reaches the far end of the storage enclosure. The dimensions on the apparatus are such that this movement usually extends the pantograph frame to its fully opened position, as seen in Figs. 1A and 1B. The lengthening of the horizontal portion of the conveyor 22 results in a shortening of the take up loops 170 (see Fig. 1B) and the lifting of the weighted slide 159 to the top of the fixed support 12.

The motor 52 is now started and the operator proceeds to stack the cans A which are delivered to the loading tray 70 by the endless conveyor 22. As the stack or pile of cans A is built up in the storage enclosure, the operator gradually moves the movable frame 24 backwards towards the fixed frame 12. This procedure is repeated until the apparatus reaches its collapsed position (see Fig. 2). The bolts 176 are then tightened to mount the fixed stand upon the movable base 28, and the apparatus is removed from the enclosure.

It will be noted that the apparatus of the instant invention makes it possible for the operator to concentrate on the actual stacking of the cans A, since he need not concern himself with adjusting the length of the supply conveyor 22 other than to simply move the movable support 24 backwards as the stacking progresses, for the pantograph frame collapses automatically in response to this movement of the support 24 and the weighted slide 159 causes the loops 170 to elongate and automatically take up the resultant slack in the conveyor 22. If desired, the movable support 24 may even be motorized to further relieve the operator. If this is done, the apparatus can be so arranged that by merely pressing on a starter switch the operator can cause the support 24 to move backwards a predetermined desired distance. However, such motorization is not deemed necessary in most instances, since very little effort is required on the part of the operator to manually move the movable support 24.

While the apparatus disclosed in the drawings embodies the preferred form of the invention, it is obvious that various modifications can be usefully employed in its construction. One such obvious change is to employ a single flat belt for the conveyor 22 in place of the spaced chains 38. When such a belt is employed, wide pulleys or rollers would of course be substituted for the sprockets. For this reason, the terms "sprockets" when used in the appended claims is intended to also cover such rotary supporting devices as pulleys, rollers, etc.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An apparatus for conveying cans in a storage enclosure, comprising a stationary vertical frame disposed adjacent the enclosure entrance, a second vertical frame movable between said stationary frame and a far end of said enclosure, an endless conveyor mounted at its ends adjacent the upper ends of both of said frames for movement therebetween for delivering cans from said stationary frame to said movable frame, the effective operating length of said conveyor being automatically controlled by the relative movement between said frames, automatically extensible and collapsible supporting means disposed between said frames and secured at each end thereto for supporting said conveyor intermediate its ends, means for maintaining said conveyor under constant tension to permit variations of its effective operating length as said movable frame is moved away from and toward said stationary frame and to constantly bias said movable frame for easy movement toward said stationary frame, said tensioning means comprising a plurality of sprockets fixedly mounted adjacent the top of one of said frames and a plurality of movable sprockets carried by a weighted slide mounted for vertical movement in said same frame below said fixedly mounted sprockets, said endless conveyor operating vertically between said fixed sprockets and said vertically movable sprockets, and means for temporarily mounting said stationary frame on said movable frame to provide a compact unitary assembly to facilitate movement through said storage enclosure entrance into and out of operating position.

2. The apparatus of claim 1 wherein said movable frame is provided with a base having a recess formed therein for receiving said stationary frame, and wherein means are provided on one of said frames for mounting said stationary frame on said movable frame when said stationary frame is disposed in said recess.

3. The apparatus of claim 2 wherein said movable frame is provided with guide means engageable against a side wall of said enclosure to guide said frame as it is moved along said enclosure wall and to maintain said recess in alignment with said stationary frame.

4. The apparatus of claim 1 wherein said tensioning means are disposed in said stationary frame.

5. An apparatus for conveying cans in a storage enclosure, comprising a stationary vertical frame, a second vertical frame movable between said stationary frame and a far end of said enclosure, a delivery can runway on one of said frames and a discharge can runway on the other frame, each of said runways having lateral guides spaced apart by a distance not less than the length of a said can, an endless chain conveyor mounted at its ends adjacent the upper ends of both of said frames for movement therebetween for conveying cans between said delivery and discharge runways on the frames, the effective operating length of said conveyor being automatically controlled by the relative movement between said frames, automatically extensible and collapsible supporting means disposed between said frames and secured at each end thereto for supporting said conveyor intermediate its ends, and means for maintaining said conveyor under constant tension to permit variations of its effective operating length as said movable frame is moved away from and toward said stationary frame and to constantly bias said movable frame for easy movement toward said stationary frame, said tensioning means comprising a plurality of fixed sprockets rotatably mounted in bearings on a said frame adjacent the top thereof and a plurality of movable sprockets rotatably mounted in bearings on a weighted slide mounted for vertical movement in said frame below said fixed sprockets, said endless chain conveyor operating vertically between said fixed sprockets and said vertically movable sprockets and having closely spaced outer lateral links formed with upstanding side plates, said plates being spaced apart transversely by a distance not less than the length of a said can and disposed substantially in alignment with the lateral guides of said can runways for receiving, conveying and delivering each can from said delivery runway to said discharge runway in alignment with said runways.

References Cited in the file of this patent

UNITED STATES PATENTS

| | | |
|---|---|---|
| 2,286,666 | Briggs | June 16, 1942 |
| 2,633,977 | McMillan | Apr. 7, 1953 |
| 2,678,125 | Bonney | May 11, 1954 |

FOREIGN PATENTS

| | | |
|---|---|---|
| 340,620 | Germany | Sept. 15, 1921 |
| 483,194 | Germany | Sept. 26, 1929 |